United States Patent
Nakagawa (10) Patent No.: US 7,690,018 B2
(45) Date of Patent: Mar. 30, 2010

(54) DATA PROCESSING APPARATUS AND METHOD

(75) Inventor: Toshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1528 days.

(21) Appl. No.: 10/227,857

(22) Filed: Aug. 27, 2002

(65) Prior Publication Data

US 2003/0046691 A1 Mar. 6, 2003

(30) Foreign Application Priority Data

Aug. 31, 2001 (JP) ............................. 2001-264667
Jul. 22, 2002 (JP) ............................. 2002-212618

(51) Int. Cl.
H04N 7/173 (2006.01)

(52) U.S. Cl. ............................. 725/86; 725/87; 725/93; 725/133

(58) Field of Classification Search .................. 725/86, 725/87, 93, 133
See application file for complete search history.

(56) References Cited

U.S. PATENT DOCUMENTS

| 5,796,391 | A | * | 8/1998 | Chiu et al. ................... 345/204 |
| 5,960,126 | A | * | 9/1999 | Nielsen et al. ............... 382/298 |
| 6,044,397 | A | * | 3/2000 | Eleftheriadis et al. ....... 725/139 |
| 6,542,546 | B1 | * | 4/2003 | Vetro et al. ............. 375/240.12 |
| 6,856,616 | B1 | * | 2/2005 | Schuster et al. ............. 370/352 |
| 6,973,619 | B1 | | 12/2005 | Hirose et al. ................. 715/530 |
| 7,236,520 | B2 | * | 6/2007 | Kim et al. ............... 375/240.01 |
| 2001/0047517 | A1 | * | 11/2001 | Christopoulos et al. ....... 725/87 |
| 2002/0069265 | A1 | * | 6/2002 | Bountour et al. ............ 709/219 |

FOREIGN PATENT DOCUMENTS

| GB | 2 344 197 A | 5/2000 |
| JP | 11-250009 | 9/1999 |
| JP | 2000-82039 | 3/2000 |
| JP | 2000-090001 | 3/2000 |

OTHER PUBLICATIONS

"Information Technology—Coding of Audio-visual Objects—Part 1: Systems", International Standard, ISO/IEC 14496-1, Oct. 1, 2001, Second Edition, 691 pages.

* cited by examiner

Primary Examiner—Christopher Kelley
Assistant Examiner—Franklin S Andramuno
(74) Attorney, Agent, or Firm—Fitzpatrick, Cella, Harper & Scinto (57) ABSTRACT

A device information analysis circuit 108 analyzes type and capability of reception terminal, and in accordance with the result of analysis, a scene/object conversion circuit 1002 refers to object description data 103 and scene description data 104, and determines whether or not display positions and placement (layout of the respective objects in a display screen of the reception terminal) of respective objects must be changed. If it is determined that the display position and placement must be changed, the display positions and the placement of the respective objects described in the scene description data 104 and the object description data 103 are converted in accordance with the result of analysis by the device information analysis circuit 108.

11 Claims, 11 Drawing Sheets

```
Group {
    children [
        Transform2D {
            translation 0 0
            children [
                Shape {
                    geometry Bitmap {}
                    appearance Appearance {
                        material Material {}
                        texture DEF MT1 MovieTexture {
                            starttime -1
                            url 1
                        }
                    }
                }
            ]
        }
        Transform2D {
            translation 60 300
            children [
                Shape {
                    geometry Bitmap {}
                    appearance Appearance {
                        material Material2D {}
                        texture ImageTexture {
                            url 2
                        }
                    }
                }
                DEF TS1 TouchSensor {}
            ]
        }
        Transform2D {
            translation 180 300
            children [
                Shape {
                    geometry Bitmap {}
                    appearance Appearance {
                        material Material2D {}
                        texture ImageTexture {
                            url 3
                        }
                    }
                }
                DEF TS2 TouchSensor {}
            ]
        }
    ] // children
} // Group ROUTE TS1. touchTime TO MT1. startTime
ROUTE TS2. touchTime TO MT1. stopTime UPDATE OD [
    {
        }       objectDescriptorID 1
    {
        '       objectDescriptorID 2
    {
                objectDescriptorID 3
```

Node1, Node2, Node3 labels indicate the three Transform2D subtrees respectively.

FIG. 4

```
                    {
                            ObjectDescriptorID 1
                            esDescr [
                                    {
                                            ES_ID 100
                                            muxInfo
                                            {
                                                    fileName ./football.bits
                                                    streamFormat MPEG4-Video
                                            }
MOVING              
IMAGE                                       desConfigDescr {
201                                                 streamType 0x04              // VisualStream
                                                    objectTypeIndication 0x20    // MPEG4Video
                                            }
                                    }
                            ]
                    }
```

```
                    {
                            ObjectDescriptorID 2
                            esDescr [
                                    {
                                            ES_ID 101
                                            muxInfo
                                            {
                                                    fileName ./startButton.jpg
                                                    streamFormat JPEG
STILL                                       }
IMAGE                                       desConfigDescr {
FOR                                                 streamType 0x04              // VisualStream
START                                               objectTypeIndication 0x6C    // JPEG
BUTTON                                      }
202                             }
                            ]
                    }
```

```
                    {
                            ObjectDescriptorID 3
                            esDescr [
                                    {
                                            ES_ID 102
                                            muxInfo
                                            {
                                                    fileName ./stopButton.jpg
                                                    streamFormat JPEG
STILL                                       }
IMAGE                                       desConfigDescr {
FOR                                                 streamType 0x04              // VisualStream
STOP                                                objectTypeIndication 0x6C    // JPEG
BUTTON                                      }
203                             }
                            ]
                    }
```

FIG. 5

| streamType value | stream type description |
|---|---|
| 0x00 | forbidden |
| 0x01 | ObjectDescriptorStream |
| 0x02 | ClockReferenceStream |
| 0x03 | SceneDescriptionStream |
| 0x04 | VisualStream |
| 0x05 | AudioStream |
| 0x06 | MPEG7Stream |
| 0x07 | IPMPStream |
| 0x08 | ObjectContentInfoStream |
| 0x09-0x1F | reserved for ISO use |
| 0x09-0x3F | user private |

FIG. 6

| Value | objectTypeIndecation description |
|---|---|
| 0x00 | forbidden |
| 0x01-0x1F | reserved for ISO use |
| 0x20 | Visual ISO/IEC 14496-2 |
| 0x21-0x3F | reserved for ISO use |
| 0x40 | Audio ISO/IEC 14496-3 |
| 0x41-0x5F | reserved for ISO use |
| 0x60 | Visual ISO/IEC 13818-2 Simple Profile |
| 0x61 | Visual ISO/IEC 13818-2 Main Profile |
| 0x62 | Visual ISO/IEC 13818-2 SNR Profile |
| 0x63 | Visual ISO/IEC 13818-2 Special Profile |
| 0x64 | Visual ISO/IEC 13818-2 High Profile |
| 0x65 | Visual ISO/IEC 13818-2 422 Profile |
| 0x66 | Audio ISO/IEC 13818-7 Main Profile |
| 0x67 | Audio ISO/IEC 13818-7 LowComplexity Profile |
| 0x68 | Audio ISO/IEC 13818-7 SSR Profile |
| 0x69 | Audio ISO/IEC 13818-3 SSR Profile |
| 0x6A | Visual ISO/IEC 11172-2 |
| 0x6B | Audio ISO/IEC 11172-3 |
| 0x6C | Visual ISO/IEC 10918-1 |
| 0x6D-0xBF | reserved for ISO use |
| 0xC0-0xFE | user private |
| 0xFF | no profile specified |

DATA PROCESSING APPARATUS AND METHOD

FIELD OF THE INVENTION

The present invention relates to data processing apparatus and method, and program and storage medium for delivery of multimedia data to reception terminals connected to the apparatus via a network.

BACKGROUND OF THE INVENTION

Nowadays schemes for multiplexing and synchronization of coded bit stream of multimedia data including plural objects such as a moving image, a sound, a text and a CG are standardized in the ISO/IEC 14496 part 1 (MPEG-4 Systems). In the MPEG-4 Systems, operations of ideal terminal model called a system decoder model are defined.

The above MPEG-4 data stream, which is different from conventional general multimedia stream, has a function of independently transmitting/receiving plural video scenes and video objects on a single stream. Further, as for audio data, plural objects can be reproduced from a single stream. The MPEG-4 data stream includes BIFS (Binary Format for Scenes) expanded from VRML (Virtual Reality Modeling Language) for handling natural moving images and sounds as information defining spatial and time placement of respective objects as well as conventional video and audio data. The BIFS is information describing an MPEG-4 scene by binary representation.

As respective objects necessary for scene synthesis are independently subjected to an optimum coding before they are transmitted, they are independently decoded on the decoding side. In accordance with the description of the above BIFS, time axes of the respective data are synchronized to that inside a reproduction device, thereby the scene is synthesized and reproduced.

When a bit stream of such multimedia data is transmitted, it is necessary to generate and transmit data having an optimum amount of information in correspondence with capability and type of reception side terminal and the status of communication line. That is, if the reception side terminal is a mobile information terminal with a low processing capability such as a cellular phone or a PDA (Personal Data Assistant) or if the communication line is crowded, it is necessary for the transmission side to previously compress the transmission data by a high compression rate coding format, otherwise to reduce the image size, the transmission rate or frame rate then encode the data.

Plural schemes have been proposed for optimizing the information amount then encoding and transmitting data by controlling moving image/audio rate, selecting time/spatial scalability, converting image size, and/or controlling error durability in correspondence with capability of reception side terminal and the status of communication line.

However, regarding transmission of bit stream having plural objects such as a still image, a moving image, a CG, a text and the like, no scheme has been proposed for optimizing display positions and placement of the respective objects then encoding and transmitting the data.

The present invention has been made in consideration of the above problems, and has its object to provide data processing apparatus and method for, upon coding and delivery of multimedia data having plural objects such as a moving image, a still image, a text and a CG, changing the multimedia data such that the respective objects and the layout thereof are changed in correspondence with the type and capability of the reception side terminal.

SUMMARY OF THE INVENTION

In order to achieve the object of the present invention, for example, a data processing apparatus for delivering coded multimedia data to a reception terminal connected to the apparatus via a network, comprising:

analysis means for receiving device information of the reception terminal and analyzing type and capability of the reception terminal;

change means for changing first object description data and first scene description data constructing the multimedia data in accordance with the result of analysis by the analysis means, thereby changing object(s) constructing the multimedia data and a layout of the object(s) in a display screen of the reception terminal and generating second object description data and second scene description data; and selection means for selecting a coded bit stream of the object(s) from predetermined storage device in correspondence with change by the change means, wherein the second object description data and the second scene description data are encoded, and wherein the result of coding is multiplexed with the coded bit stream of the object(s) selected by the selection means thereby coded multimedia data is generated, further wherein the coded multimedia data is delivered to the reception terminal.

In order to achieve the object of the present invention, for example, a data processing apparatus for delivering coded multimedia data to a reception terminal connected to the apparatus via a network, comprising:

analysis means for receiving device information of the reception terminal and analyzing type and capability of the reception terminal;

change means for changing first object description data and first scene description data constructing the multimedia data in accordance with the result of analysis by the analysis means, thereby changing object(s) constructing the multimedia data and a layout of the object(s) in a display screen of the reception terminal and generating second object description data and second scene description data; and generation means for generating a coded bit stream of the object(s) in correspondence with the result of analysis by the analysis means, wherein the second object description data and the second scene description data are encoded, and wherein the result of coding is multiplexed with the coded bit stream of the object(s) generated by the generation means thereby coded multimedia data is generated, further wherein the coded multimedia data is delivered to the reception terminal.

In order to achieve the object of the present invention, for example, a data processing method for delivering coded multimedia data to a reception terminal connected to the apparatus via a network, comprising:

an analysis step of receiving device information of the reception terminal and analyzing type and capability of the reception terminal;

a change step of changing first object description data and first scene description data constructing the multimedia data in accordance with the result of analysis in the analysis step, thereby changing object(s) constructing the multimedia data and a layout of the object(s) in a display screen of the reception terminal and generating second object description data and second scene description data; and a selection step of selecting a coded bit stream of the object(s) from predetermined storage device in correspondence with change in the change step, wherein the second object description data and the second scene description data are encoded, and wherein the result of coding is multiplexed with the coded bit stream of the object(s) selected by the selection means thereby coded multimedia data is generated, further wherein the coded multimedia data is delivered to the reception terminal.

In order to achieve the object of the present invention, for example, a data processing method for delivering coded multimedia data to a reception terminal connected to the apparatus via a network, comprising:

an analysis step of receiving device information of the reception terminal and analyzing type and capability of the reception terminal;

a change step of changing first object description data and first scene description data constructing the multimedia data in accordance with the result of analysis in the analysis step, thereby changing object(s) constructing the multimedia data and a layout of the object(s) in a display screen of the reception terminal and generating second object description data and second scene description data; and a generation step of generating a coded bit stream of the object(s) in correspondence with the result of analysis in the analysis step, wherein the second object description data and the second scene description data are encoded, and wherein the result of coding is multiplexed with the coded bit stream of the object(s) generated by the generation means thereby coded multimedia data is generated, further wherein the coded multimedia data is delivered to the reception terminal.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinbelow, preferred embodiments where a data processing apparatus of the present invention is applied to a multimedia data delivery apparatus will be described in detail with reference to the drawings.

First Embodiment

Figure 1:
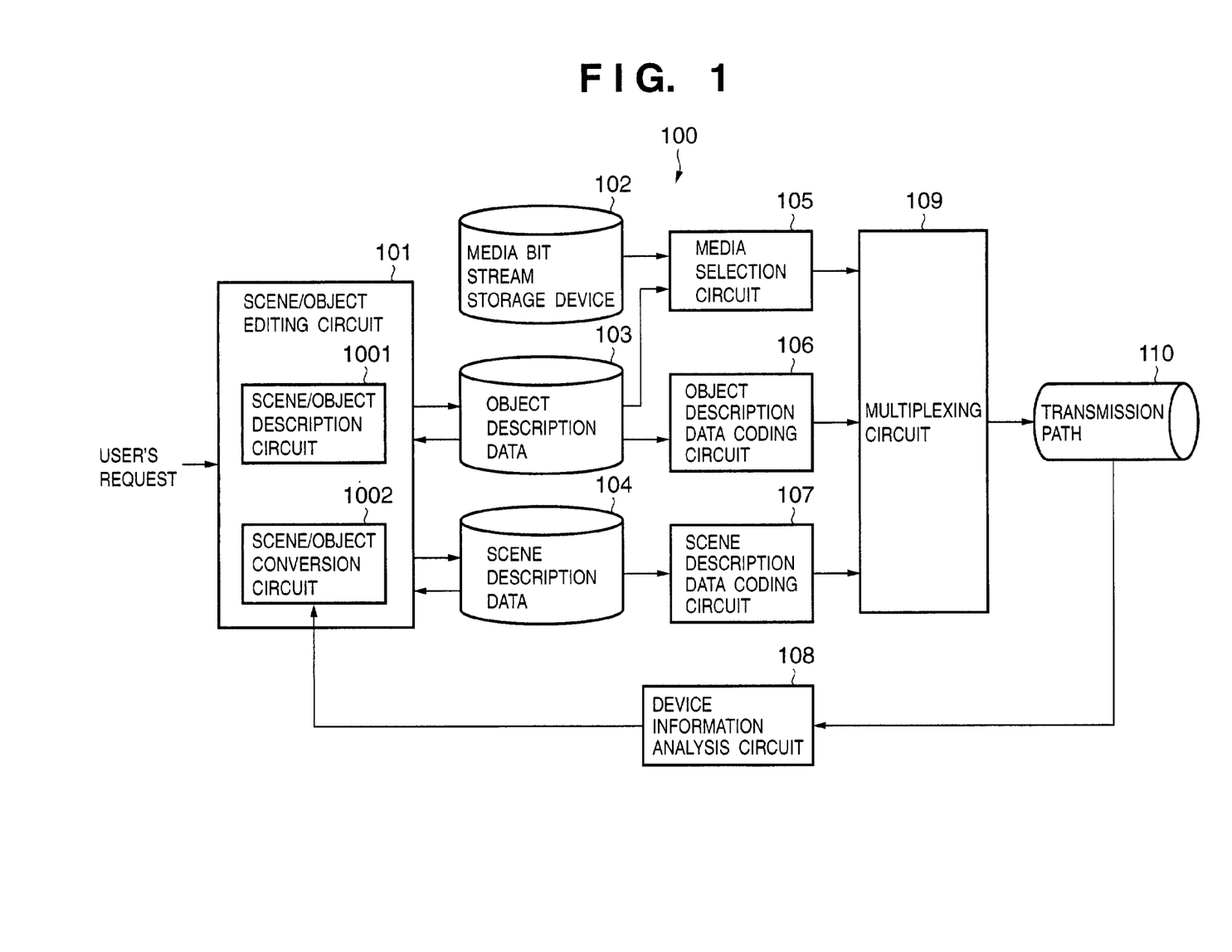
FIG. 1 is a block diagram showing the basic construction of a delivery apparatus according to a first embodiment of the present invention and showing the data flow among respective circuits.

FIG. 1 is a block diagram showing the basic construction of the multimedia data delivery apparatus (hereinafter simply referred to as a delivery apparatus) according to a first embodiment and showing the data flow among respective circuits.

In FIG. 1, the delivery apparatus has a scene/object editing circuit 101, a media bit stream storage device 102, a media selection circuit 105, an object description data coding circuit 106, a scene description data coding circuit 107, a device information analysis circuit 108, and a multiplexing circuit 109. The scene/object editing circuit 101 has a scene/object description circuit 1001 and a scene/object conversion circuit 1002.

The scene/object editing circuit 101 generates scene description data 104 for spatial/time arrangement of media objects such as a still image, a moving image and a sound, a text, a CG and the like, in accordance with a request from a user or a request from the device information analysis circuit 108. A scene is a screen image structure presented to a viewer, which is generated by using the above-described BIFS as a scene description language in the MPEG-4 system part. In this embodiment, the scene/object description circuit 1001 may newly generate the scene description data 104, or the scene/object conversion circuit 1002 may read and re-edit the scene description data 104 stored in a predetermined storage device.

At this time, the scene/object editing circuit 101 generates object description data 103. The object description data 103 is information on linkage of the scene description data 104 and the respective media objects constructing the scene, a coding method, a packet structure and the like, as necessary information for decoding. As in the case of the scene description data 104, the scene/object description circuit 1001 may newly generate the object description data 103, or the scene/object conversion circuit 1002 may read and re-edit the object description data 103 stored in a predetermined storage device.

Further, in FIG. 1, reference numeral 110 denotes a transmission path represented by various networks. In the present embodiment, the transmission path 110 is a network for delivery of processed or coded multimedia data. Further, the transmission path 110 is not merely a communication path such as a broadcast network or a communication network but includes a storage medium such as a DVD-RAM.

Figure 2:
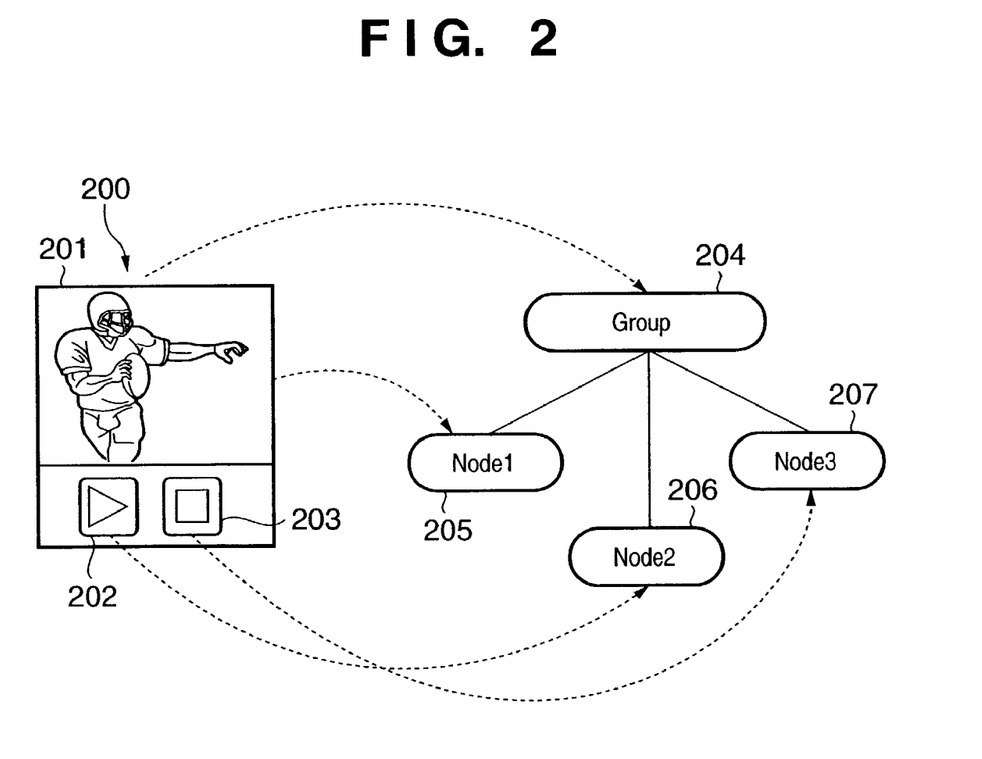
FIG. 2 is an explanatory view showing the relation between the BIFS and media objects constructing scene.

Next, the relation between the BIFS and media objects constructing scene will be described with reference to FIG. 2. In FIG. 2, a moving image 201, a start button 202, and a stop button 203 are arranged in a screen image 200. The start button 202 and the stop button 203 have a touch sensor functions. For example, reproduction of the moving image 201 can be started/ended by selecting one of the these buttons 202 and 203 by using a finger, a touch pen, a mouse, a keyboard or the like by the users, when screen image 200 is displayed on the display screen of user's reception terminal.

In a case where the user arranges the respective objects as shown in FIG. 2, the scene/object editing circuit 101 first describes a Group node 204 in the screen image 200. All the BIFS scenes start with a node SFTopNode, and the Group node is one of the SFTop Node. As sub nodes of the Group node 204, information associated with the moving image 201, the start button 202 and the stop button 203 are respectively described in Node 1(205), Node 2(206) and Node 3 (207).

An ID number indicating the location of corresponding moving image 201 object data is described in the Node 1 (205), and ID numbers indicating the locations of still image object data representing the shapes of the corresponding buttons 202 and 203 are respectively described in the Node 2 (206) and the Node 3 (207).

Figure 3:
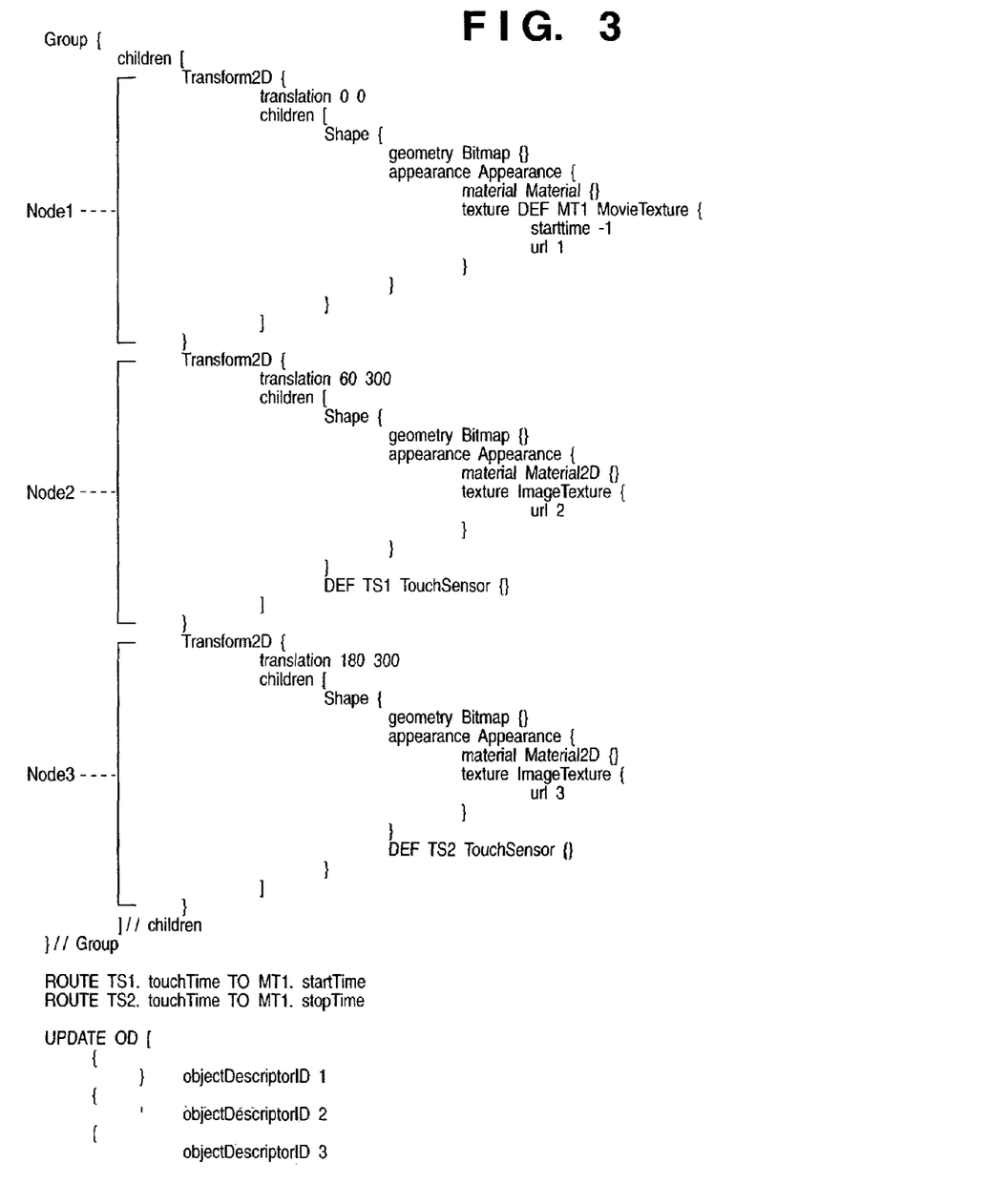
FIG. 3 is a list of scene description data describing the scene in FIG. 2.

More particularly, in the example of FIG. 2, the scene is described as shown in FIG. 3.

The above-described Group node 204 is described in the first line. Then a "children" field is used in the second line, thereby it is indicated that the above-described Node 1 (205), the Node 2 (206) and the Node 3 (207) are sub nodes of the Group node 204.

The information associated with the Node 1 (205), the Node 2 (206) and the Node 3 (207) are respectively described in the third to seventeenth lines, the eighteenth to thirty-second lines, and the thirty-third to forty-seventh line. The display positions of the respective nodes are represented by a relative position in a case where the coordinates of upper left corer of the screen are (0,0). Respective upper left coordinates of each object is described in a "translation" field of Transform2D node. Accordingly, as shown in FIG. 2, when the moving image 201, the start button 202 and the stop button 203 are arranged such that the respective upper left coordinates are (0,0), (60,300) and (180,300), the "translation" fields of the corresponding Node 1 (205), Node 2 (206) and Node 3 (207) are described as follows.

The 4th line: translation 0 0
The 19th line: translation 60 300
The 34th line: translation 180 300

Note that the coordinates are indicated in pixel units.

Then, the actually displayed moving image 201 is defined by a MovieTexture node defined by a name MT1 in the tenth line, and an ID number 1 described in a "url" field in the twelfth line indicates the location of the moving image 201 object data.

Similarly, the images representing the shapes of the start button 202 and the stop button 203 are defined by an ImageTexture node, and ID numbers 2 and 3 described in the "url" field in the twenty-sixth line and the forty-first line indicate the locations of the still image object data representing the shapes of the buttons 202 and 203.

Further, to provide the start button 202 and the stop button 203 with the touch sensor function, a TouchSensor node, defined by names TS1 and TS2, is used in the thirtieth line and the forty-fifth line.

When the user touches the start button 202, the reproduction of the moving image 201 defined by the name "MT1" is started, and when the user touches the stop button 203, the reproduction of the moving image 201 is stopped by BIFS commands, ROUTE TS1.touchTime TO MT1.startTime
ROUTE TS2.touchTime TO MT1.stopTime described in the fifty-first and fifty-second lines.

Note that detailed explanations of other nodes and fields will be omitted here.

Further, as described above, the scene/object editing circuit 101 describes the object description data 103 on linkage of the scene description data 104 and the moving and still image media objects constructing the scene, a coding method, a packet structure and the like, as necessary information for decoding.

Hereinbelow, primary elements of object description data will be described.

ObjectDescriptorID
ES (Elementary Stream) Descriptor

The data ObjectDescriptorID is an ID for discrimination of object. As described above, an ID number indicating location is assigned to a node to refer to a still image or moving image stream in scene description data. The ID number is linked with the ObjectDescriptorID.

The object description data is necessary when a session is started or when a stream is added/deleted/changed in the middle of the session. When the session has been started or a stream is newly added to the scene, a command to update the object description data (UPDATE OD) is used. In the example of scene description in FIG. 3, the object description data is updated by using the UPDATE OD command and the above-described ObjectDescriptorID in the fifty-fourth to sixty-first lines.

Further, the data ES Descriptor is necessary for respective streams of still image, moving image and sound, and each ES Descriptor is discriminated by ES_ID. The data ES Descriptor includes a stream type for determination of stream type, a profile, a buffer size, a decoder configuration descriptor (decConfigDescr) describing a maximum/mean transmission rate of the stream, necessary for a decoder, and the like. The data decConfigDescr is necessary information when it is determined whether or not this Elementary Stream can be decoded on the reception terminal side.

Figure 4:
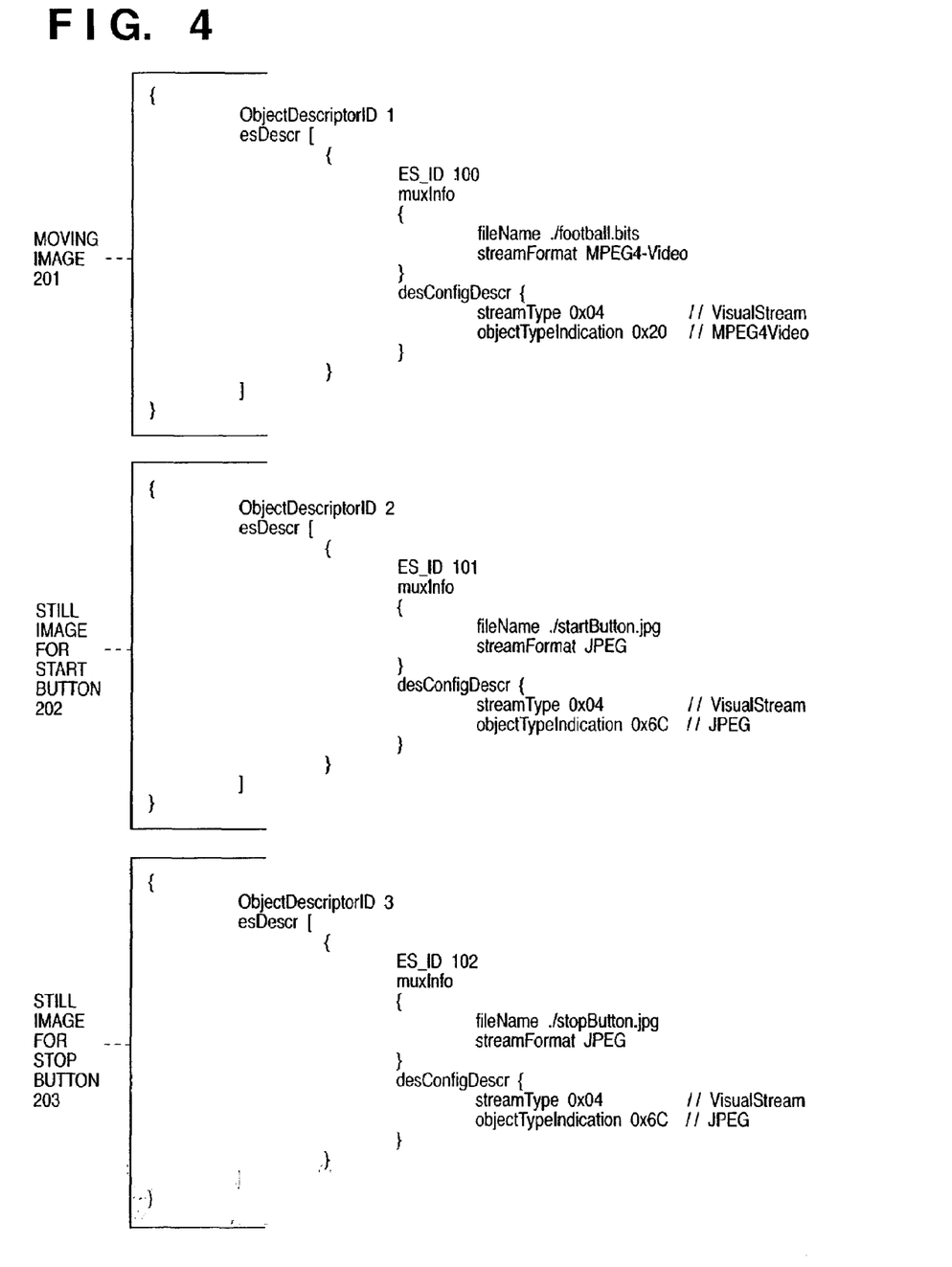
FIG. 4 is a list of object description data corresponding to the scene in FIG. 2 and the scene description data in FIG. 3.

More particularly, object description as shown in FIG. 4 is made in correspondence with the example in FIGS. 2 and 3.

The object description data has a media stream information designated in the node of scene description data. For example, the object description data regarding the moving image object 201 is described in the first to seventeenth lines; the object description data regarding the still image representing the shape of the start button 202 is described in the nineteenth to thirty-fifth lines; and the object description data regarding the still image representing the shape of the stop button 203 is described in the thirty-seventh to fifty-third lines.

As ID numbers (ObjectDescriptorID) for discrimination of the respective objects, numbers 1 to 3 are assigned in the second, twentieth and thirty-eighth lines. The ObjectDescriptorIDs are linked to the ID numbers 1 to 3 assigned to the nodes to refer to the moving image and still image streams in the above-described scene description data for linkage between the scene description data and the still image and the moving image constructing the scene.

Further, the ES Descriptors discriminated by ES_IDs 100 to 102 are described for the moving image and still image streams.

Information muxInfo in the data ES Descriptor, is used upon multiplexing. It has a "fileName" field indicating the location and name where the media stream of the object exists, and a "streamFormat" field in which the stream format of the media stream of the object is described. That is, the media stream of the moving image 201 is football.bits described in the eighth line, indicating that it is a moving image media stream which has been previously high-efficiency encoded by the MPEG-4 coding. Further, the images representing the shapes of the start button 202 and the stop button 203 are respectively startButton.jpg and stopButton.jpg described in the twenty-sixth and forty-third lines. They are still image media streams which have been previously high-efficiency encoded by the JPEG coding. These media streams football.bits, startButton.jpg and stopButton.jpg are stored in the media bit stream storage device 102.

Figure 5:
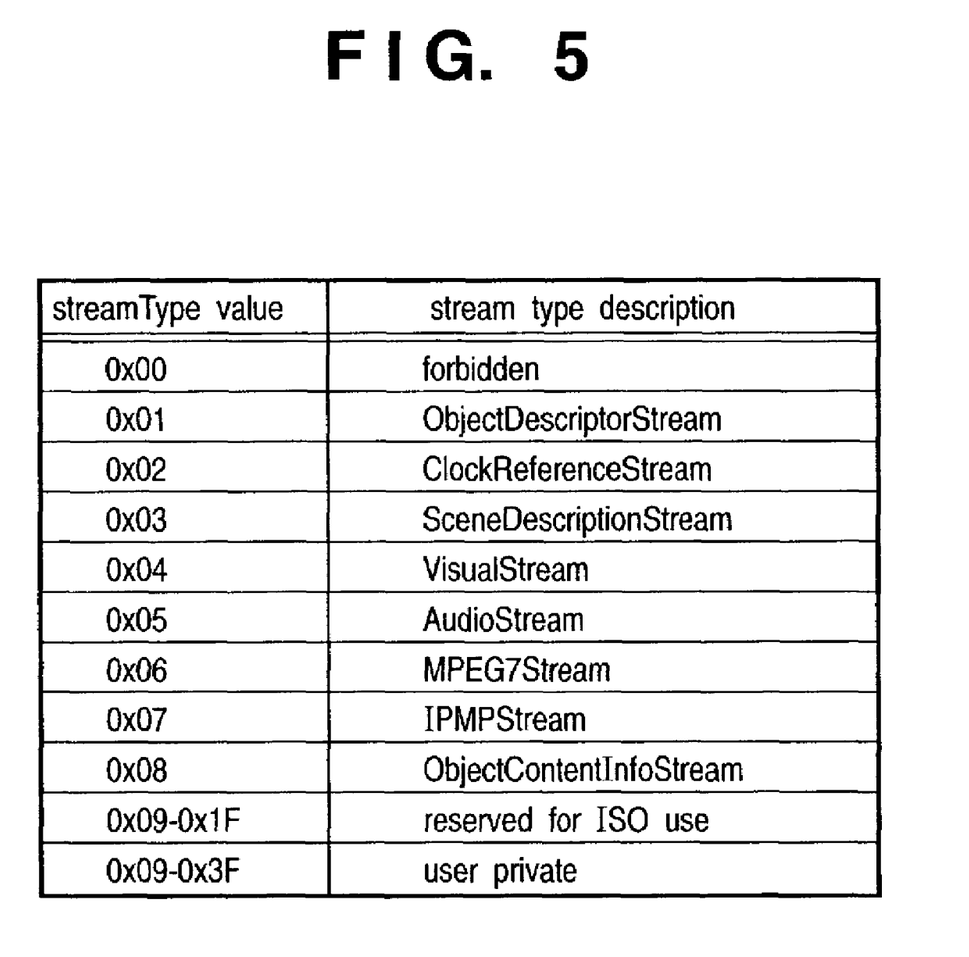
FIG. 5 is a table showing streamType values and their meanings.
Figure 6:
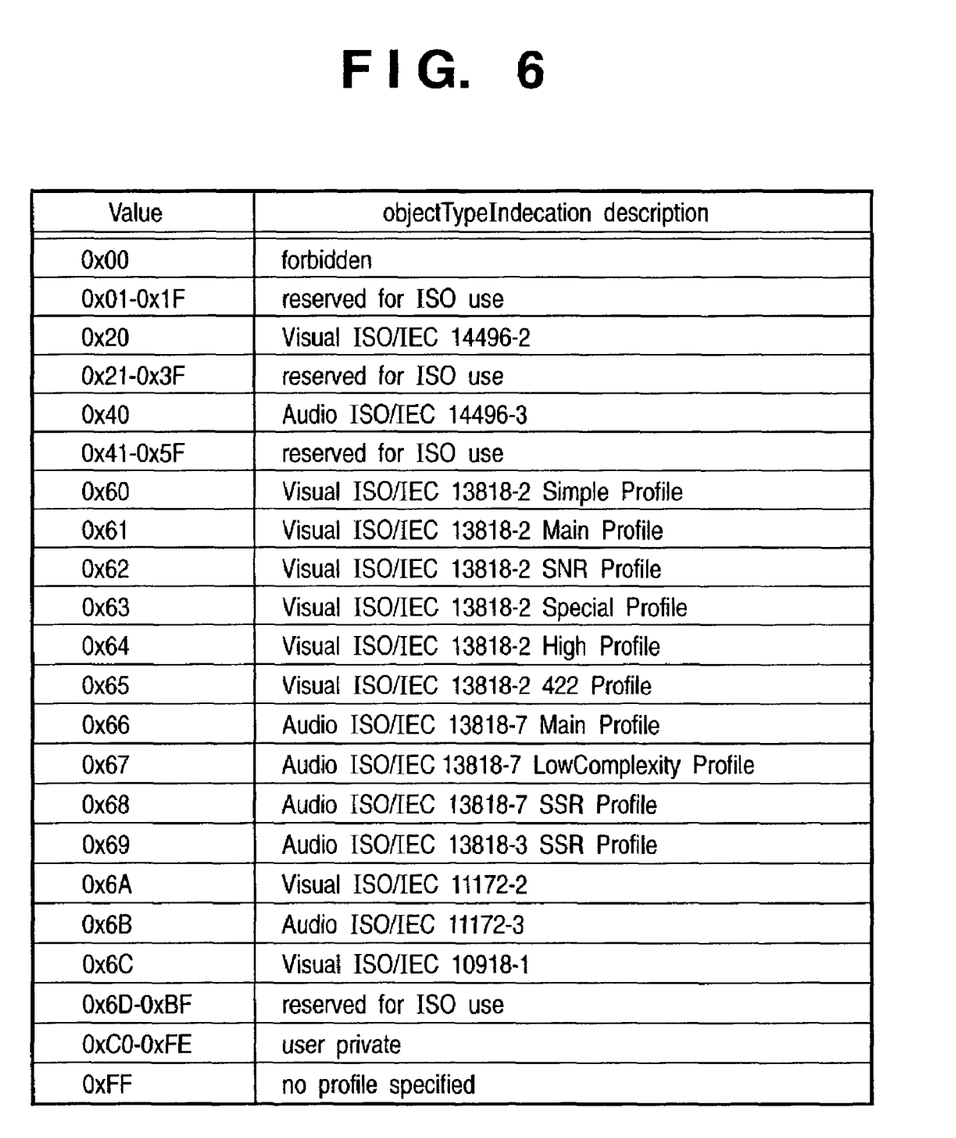
FIG. 6 is a table showing objectTypeIndication values and their meanings.

Further, a stream type (streamType) for discrimination of stream type and objectTypeIndication, these are necessary for decode side, are described in the decoder configuration descriptor (decConfigDescr) in the ES Descriptor data. FIGS. 5 and 6 show streamType values and objectTypeIndication values and their meanings. In FIG. 4, the values of the respective streamType fields are both 0×04, which means that every media stream is a VisualStream (See FIG. 5). Further, the objectTypeIndication field is information for discrimination of more detailed stream type. The value of the objectTypeIndication field in the thirteenth line is 0×20; and values in the thirty-first and forty-ninth lines, 0×6C. That is, the stream of the moving image 201 is an MPEG-4 Visual stream and the still image streams of the start button 202 and the stop button 203 are JPEG streams (See FIG. 6).

Figure 7:
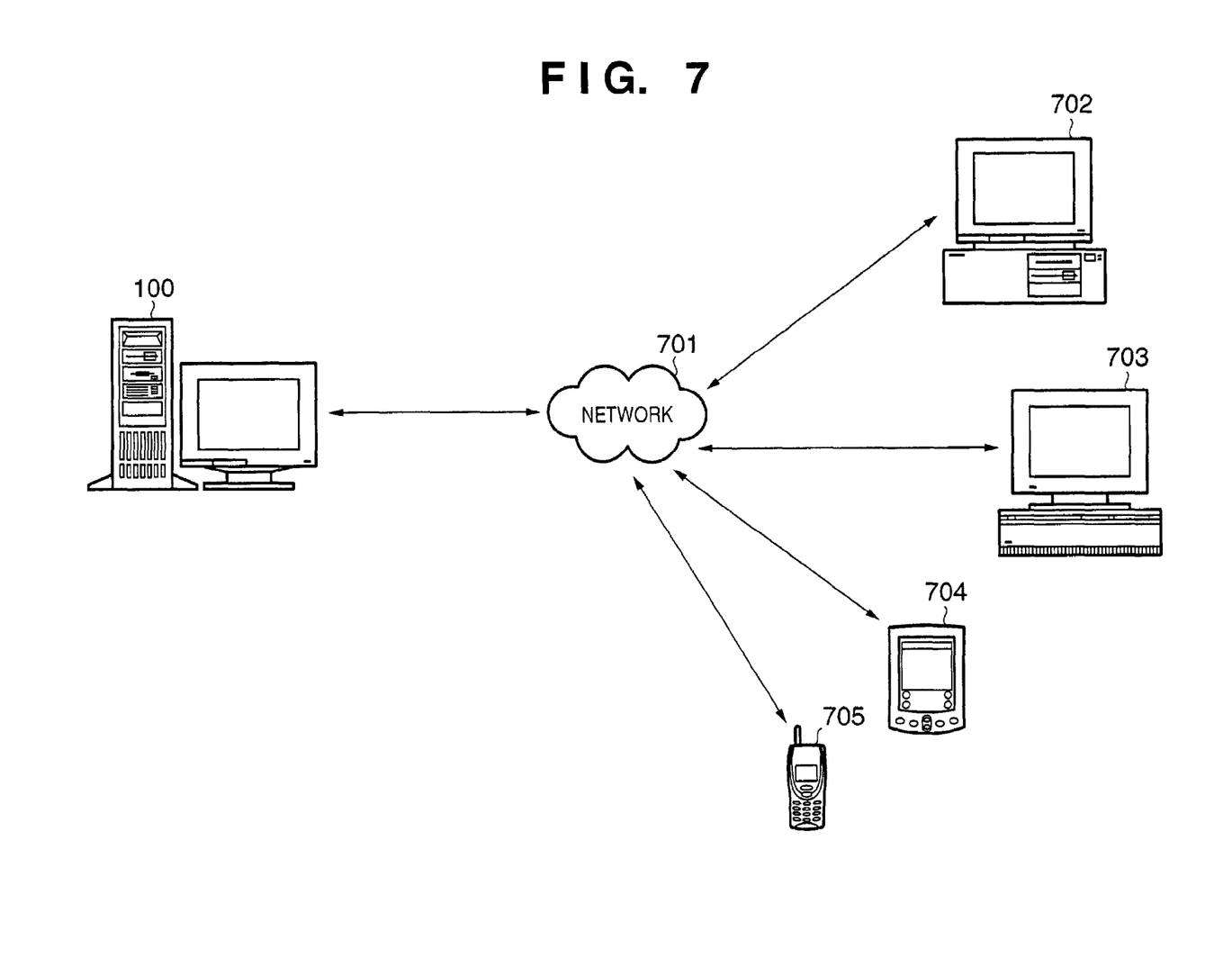
FIG. 7 is an explanatory view of plural types of reception terminals which receive multimedia data from the delivery apparatus.

In the delivery apparatus of the present embodiment, upon transmission of multimedia data having a moving and still images as described above, it is necessary to provide optimum data to plural different reception terminals 702 to 705 as shown in FIG. 7. That is, as the reception terminals PCs 702 and 703, a PDA 704 and a cellular phone 705 have respectively different processing capabilities and screen image sizes, it is necessary for delivery of multimedia data having plural objects to optimize display positions and placement of the respective objects as well as moving image size, a transmission rate and frame rate, for each device.

Figure 10:
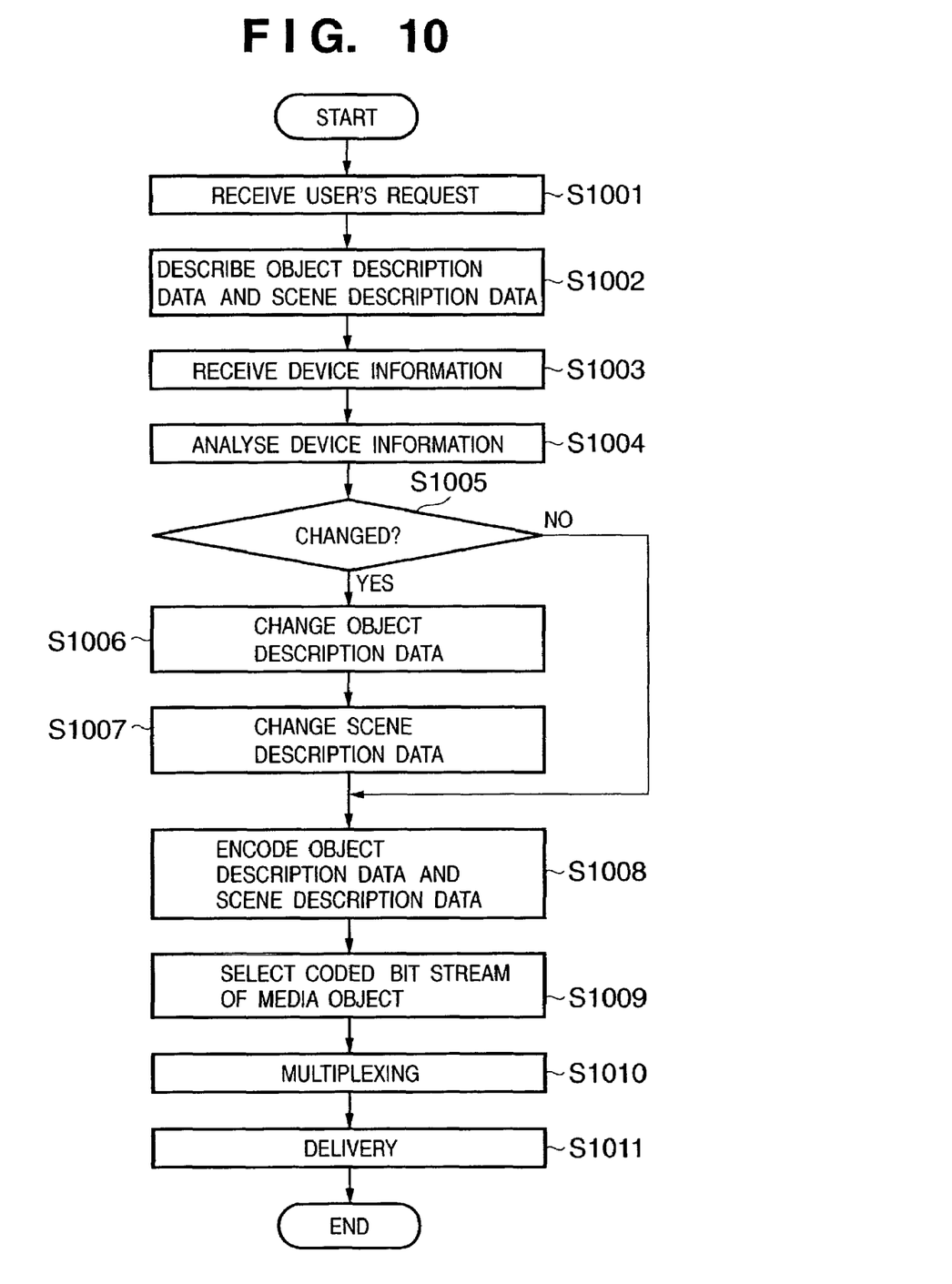
FIG. 10 is a flowchart showing processing by the delivery apparatus according to the first embodiment of the present invention for delivery of multimedia data to a reception device.

Next, processing by the delivery apparatus of the present embodiment for delivery of multimedia data to a reception device will be described with reference to the flowchart of FIG. 10.

The delivery apparatus of the present embodiment receives a multimedia data delivery request via a network 701 (corresponding to the communication path 110 in FIG. 1) from plural reception terminals 702 to 705, and receives information associated with the types and processing capabilities of the respective reception terminals (hereinbelow, device information) (steps S1001 and S1003).

As means for transmission/reception of the device information, a frame work such as CC/PP (Composite Capability/Preference Profiles) standardized in the W3C (World Wide Web Consortium) can be used. In this frame work, hardware characteristics such as a terminal device name (maker name or model name), a screen size and a memory capacity, and the like, can be described by using a XML-based meta information description language. The following description example by CC/PP shows that the hardware screen size is 320 pixels (width)×(240) pixels.

```
<?xml version="1.0"?>
<rdf:RDF  xmlns:rdf="http://www.w3.org/1999/02/22-rdf-syntax-ns#"
    xmlns:ccpp="http://www.w3.org/2000/07/04-ccpp#">
  <rdf:Description rdf:about="MyProfile">
    <ccpp:component>
      <rdf:Description rdf:about="TerminalHardware">
        <rdf:type rdf:resource="HardwarePlatform"/>
        <display>320×240</display>
      </rdf:Description>
    </ccpp:component>
  </rdf:Description>
</rdf:RDF>
```

The device information of the reception terminal is received by the device information analysis circuit 108. The circuit analyzes the type and processing capability (display capability or the like) of the reception terminal included in the received device information, and inputs the result of analysis into the scene/object conversion circuit 1002 (step S1004).

The scene/object conversion circuit 1002 receives the result of analysis from the device information analysis circuit 108, then, in correspondence with this timing of reception or in response to a previously-input user's request, refers to the object description data 103 and the scene description data 104 described by the scene/object description circuit 1001 (step S1002), to determine whether or not the display positions and placement (layout of the respective objects in the display screen of the reception terminal) of respective object are to be changed (step S1005). The determination is made by, e.g., referring to the coordinate values of the respective objects in the screen and determining whether or not all the objects can be displayed within the display screen of the reception terminal. If it is determined that the display positions and placement are not to be changed, multimedia data is generated based on the previously described object description data 103 and the scene description data 104 (steps S1008 to S1010), and the data is transmitted to the reception terminal (step S1011). The method of generation of multimedia data (steps S1008 to S1010) will be described later.

If it is determined that the display positions and placement must be changed, the display positions and placement of the respective objects described in the scene description data 104 and the object description data 103 are converted in accordance with the result of analysis by the device information analysis circuit 108 (steps S1006 and S1007).

Figure 8:
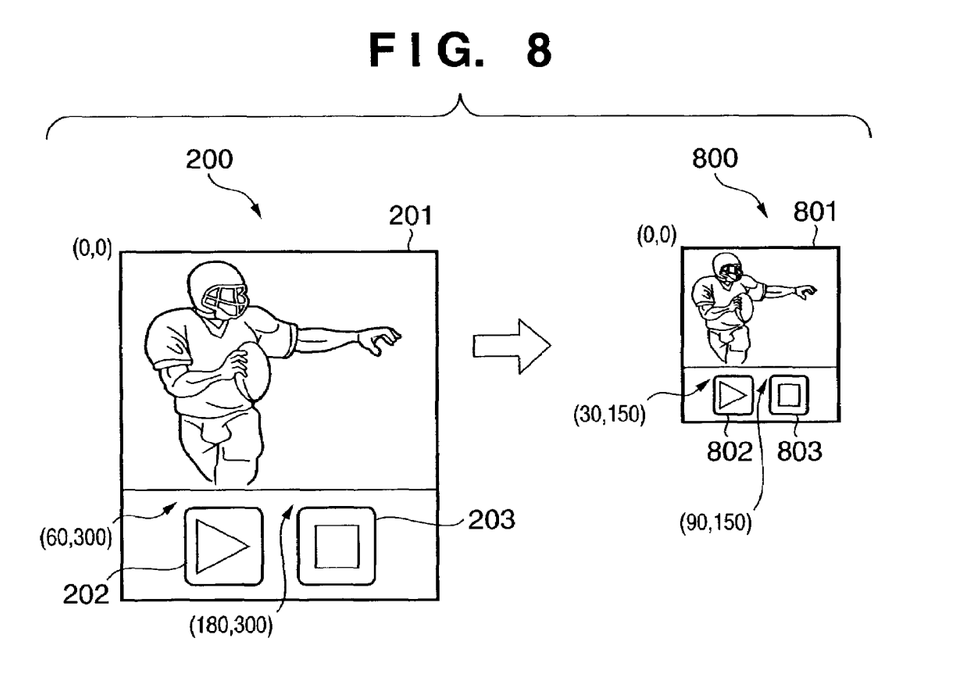
FIG. 8 is an explanatory view of a method for converting display positions and placement of respective objects described in scene description data 104 and object description data 103, in accordance with the result of analysis by a device information analysis circuit 108.

Next, the method of converting the display positions and placement of the respective objects described in the scene description data 104 and the object description data 103 in accordance with the result of analysis by the device information analysis circuit 108 will be described with reference to FIG. 8. In FIG. 8, the screen image 200 in FIG. 2 generated in accordance with the user's request is converted to a screen image 800 where the sizes and placement of the respective objects are changed for, e.g PDA.

When the scene/object conversion circuit 1002 receives the result of analysis from the device information analysis circuit 108, the scene/object conversion circuit 1002 reads the scene description data 104 and the object description data 103 used in FIGS. 2 and 3.

Then, first, the contents of the scene description data are converted for conversion of the placement of the respective objects. Note that the display position of the moving image 201 is not changed and the upper left coordinates are (0,0) in the moving image 801. However, regarding the display positions of the start button 202 and the stop button 203, the upper left coordinates (60,300) and (180,300) are converted to (30, 150) and (90,150) of start button 802 and stop button 803. As new coordinates are determined in accordance with the type and processing capability of device inputted from the device information analysis circuit 108, the coordinates are different in various devices. The new coordinate values are calculated by e.g. obtaining the ratio between the size of the screen image 200 and that of the screen image 800. If the length-towidth ratio of the screen image 200 is different from that of the screen image 800, the scaling of one screen image with a lower ratio is applied to the axis of the other screen image with a higher ratio. By executing the above process, assuming that the ratio of size between the screen image 200 and the screen image 800 is 2:1, the coordinates (100,100) in the screen image 200 is (50,50) in the screen image 800.

Accordingly, the translation field described in the nineteenth and thirty-fourth lines of the scene description data in FIG. 3 are converted as follows:

19th line: translation 60 300→translation 30 150
34th line: translation 180 300→translation 90 150

The converted scene description data is stored as scene description data for PDA.

Next, the contents of the object description data are converted for conversion of the image size of the respective objects. Note that the moving image 201 must be converted to the moving image 801; the start button 201, to the start button 802; and the stop button 203, to the stop button 803. Accordingly, the fileName field in muxinfo described in the object description data in FIG. 3 is converted as follows.

8th line: fileName football.bits→fileName footballPDA.bits
27th line: fileName startButton.jpg→fileName startButtonPDA.jpg
46th line: fileName stopButton.jpg→fileName stopButtonPDA.jpg Note that "footballPDA.bits" is a media stream of the moving image 801 previously high-efficiency coded by the MPEG-4 coding for PDA terminal, and "startButtonPDA.jpg" and "stopButtonPDA.jpg" are still image media streams representing the shapes of the start button 802 and stop button 803 previously high-efficiency coded by the JPEG coding for PDA terminal. The converted object description data is stored as object description data for PDA.

The object description data 103 and the scene description data 104 generated by the scene/object editing circuit 101 are respectively encoded by the object description data coding circuit 106 and the scene description data coding circuit 107 (step S1008), and inputted into the multiplexing circuit 109.

Further, the media selection circuit 105 reads the object description data 103, selects and reads a coded bit stream of necessary media object from the media bit stream storage device 102 (step S1009). The media bit stream storage device 102 holds coded bit streams corresponding to reception terminal types. In this case, the PDA bit streams footballPDA.bits, startButtonPDA.jpg and stopButtonPDA.jpg are selected from bit streams coded for e.g. PC, PDA and cellular phone, in accordance with the object description data 103. The read coded bit streams are inputted into the multiplexing circuit 109.

The multiplexing circuit 109 multiplexes the input scene description data, object description data and coded bit streams (step S1010) and delivers the multiplexed data as multimedia data to the reception terminal via the transmission path 110 (step S1011).

In this embodiment, the scene has one moving image and two buttons for control reproduction of the moving image, for the sake of simplification of explanation, however, objects constructing scene are not limited to moving and still images but a sound, a CG, a text and the like can be used. Accordingly, the control objects when display positions and placement of the object are converted are not limited to still image and moving image objects but any of respective objects, a CG, a text and the like constructing moving image data is applicable to the control object.

Note that the above-described still image object data is data high-efficiency (compression) encoded by e.g. the well-known JPEG coding, and the moving image object data is data high-efficiency encoded by e.g. the well-known MPEG-2, MPEG-4 or H-263 coding. The sound object data is data high-efficiency encoded by e.g. the well-known CELP (Code Excited Linear Prediction) coding, the transform-domain weighted interleave vector quantization (TWINVQ) or the like.

Second Embodiment

In the delivery apparatus of the first embodiment shown in the FIG. 1, the media selection circuit 105 refers to the object description data 103, appropriately selects necessary (previously coded) stream from the media bit stream storage device 102, input the selected stream into the multiplexing circuit 109 to multiplex the input stream with the coded object description data and scene description data, and the multimedia data is transmitted.

Figure 9:
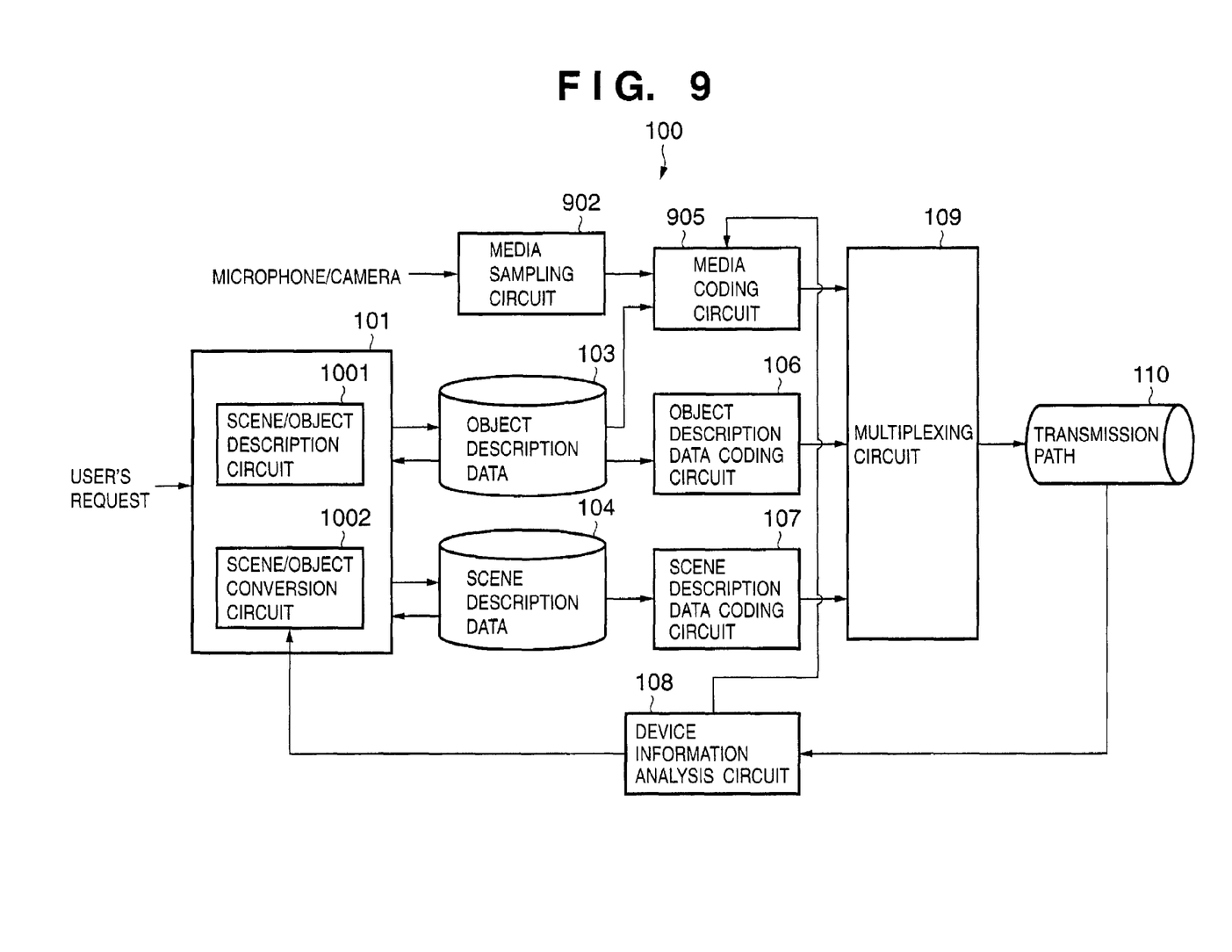
FIG. 9 is a block diagram showing the basic construction of the delivery apparatus according to a second embodiment of the present invention and showing the data flow among the respective circuits.

However, as shown in FIG. 9, by providing a media sampling circuit 902 and a media coding circuit 905 in place of the media bit stream storage device 102, a moving image or the like can be encoded in a realtime manner. As a result, even if an optimum coded bit stream for a reception terminal is not prepared in the media bit stream storage device 102, the optimum coded bit stream for the reception terminal is generated by the media sampling circuit 902 and the media coding circuit 905, and the bit stream can be delivered to the reception terminal. FIG. 9 is a block diagram showing the basic construction of the delivery apparatus according to the second embodiment of the present invention and showing the data flow among the respective circuits. In FIG. 9, the elements corresponding to those in FIG. 1 have the same reference numerals.

In FIG. 9, the media coding circuit 905 refers to the object description data 103, and encodes a sound, a still image and a moving image, which have been inputted from microphone and video camera and sampled by the media sampling circuit 902, in a realtime manner. The media coding circuit 905, having a sound coding circuit, a still image coding circuit and a moving image coding circuit, encodes the sound, still image and moving image inputted from the media sampling circuit 902 by the respective corresponding coding circuits. Upon coding, as it is necessary to perform coding corresponding to the type of reception terminal (coding control such as quantization step control), the media coding circuit 905 refers to the device information of the reception terminal from the device information analysis circuit 108.

The coded bit stream is inputted into the multiplexing circuit 109. As in the case of the first embodiment, the input bit stream is multiplexed with the object description data encoded by the object description data coding circuit 106, the scene description data encoded by the scene description data coding circuit 107, and transmitted as multimedia data.

As described above, the construction for encoding a moving image or the like in a realtime manner by using the media sampling circuit 902 and the media coding circuit 905 can optimize the display positions and placement of the respective objects and encode a result of the optimization in correspondence with the type and capability of multimedia data reception terminal connected to the network and transmit, upon encoding multimedia data including plural objects and transmitting, same as purpose of the first embodiment.

Third Embodiment

Figure 11:
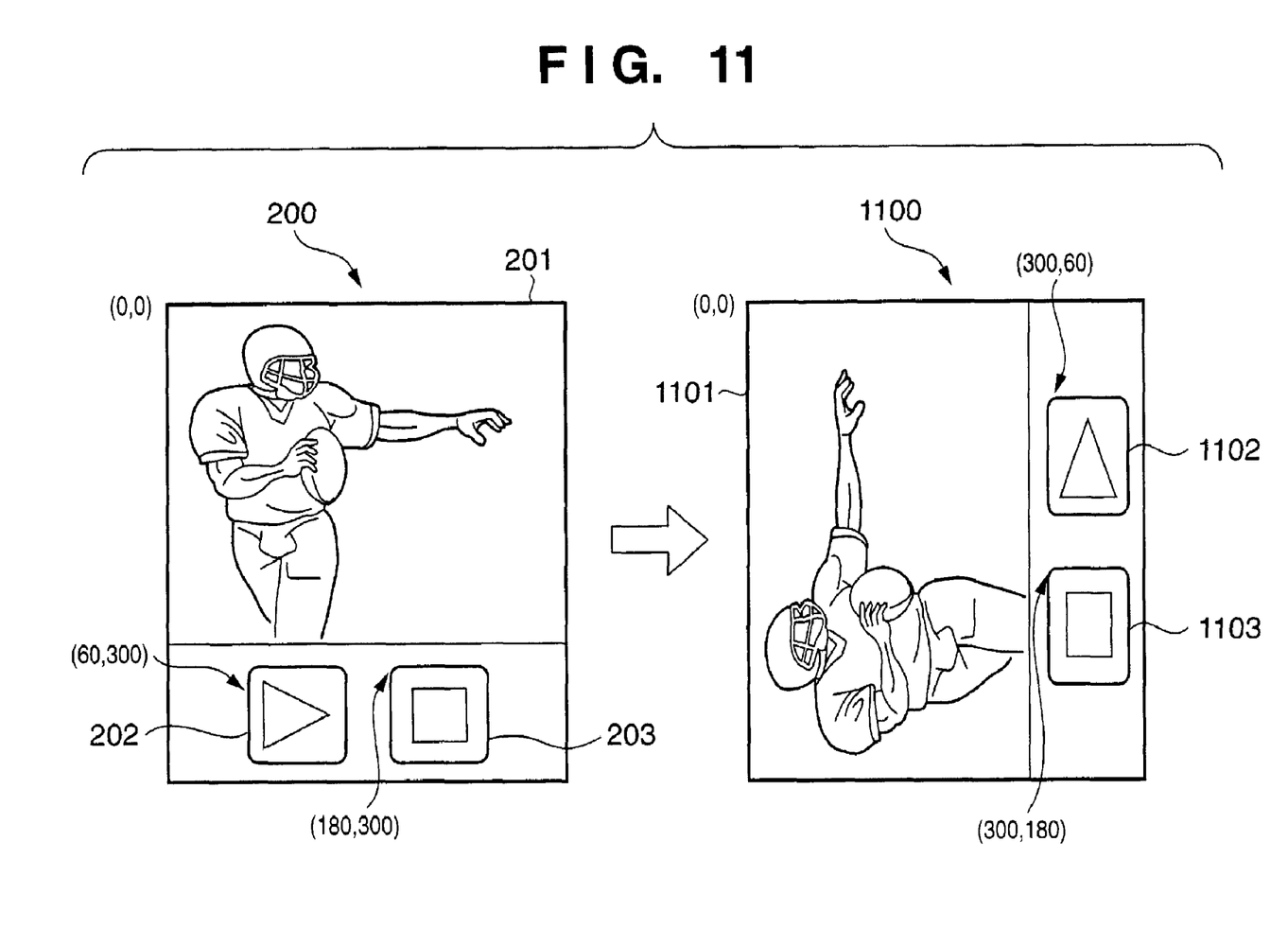
FIG. 11 is an explanatory view of the method for converting display positions and placement of respective objects described in the scene description data 104 and the object description data 103, in accordance with the result of analysis by the device information analysis circuit 108, according to a third embodiment of the present invention.

In the first embodiment shown in FIG. 8, when the multimedia data having the moving and still images is transmitted, the screen image 200 generated in accordance with the user's request is converted to the screen image 800 where the sizes and placement of the respective objects for PDA terminal. However, as shown in FIG. 11, in accordance with the length-to-width ratio of hardware screen size, the screen image 200 generated in accordance with the user's request may be converted to a screen image 1100 where the sizes and placement of the respective objects are changed for display changed from portrait display to landscape display.

The device information of reception terminal is received by the device information analysis circuit 108, and the display positions and placement of the respective objects described in the scene description data 104 and the object description data 103 are converted in accordance with necessity. The new coordinate values to be converted, for example, can be calculated from the length-to-width ratio of screen image size as well as the ratio between the size of the screen image 200 and that of the screen image 800 as in the case of the first embodiment in FIG. 8. In the example of FIG. 11, the screen image 200 in FIG. 2 generated in accordance with the user's request is converted so as to the sizes and placement of the respective objects in the screen image 1100. The size of the screen image 200 is 300 pixels (width)×400 pixels (height), and the size of the screen image 1100 is 400 pixels (width)×300 pixels (height). The upper left coordinates of the moving image 201 is (0,0) in the moving image 1101. However, the upper left coordinates of the display positions of the start button 202 and the stop button 203 are respectively (60,300) and (180,300), so it must be converted to (300,60) and (300,180) such as start button 1102 and stop button 1103.

Accordingly, the translation field described in the nineteenth and thirty-fourth lines of the scene description data in FIG. 3 are converted such that the x and y coordinates are exchanged with each other, as follows.

19th line: translation 60 300→translation 300 60
34th line: translation 180 300→translation 300 180

Further, a rotationAngle field is added under the translation field described in the fourth, nineteenth and thirty-fourth lines, as follows.

4th, 19th and 34th lines:
translation x y→translation x y
rotationAngle −1.57

Note that values x and y are arbitrary values determined by the above-described coordinate conversion. Further, the rotationAngle field is a field designating the amount of clockwise rotation by radian. As −1.57 radian means 90° counterclockwise rotation, the displayed respective objects are turned 90° in the counterclockwise direction.

As in the case of the first embodiment, the scene description data converted by the scene/object editing circuit 101 is encoded by the scene description data coding circuit 107, and inputted into the multiplexing circuit 109. The input scene description data is multiplexed with the object description data encoded by the object description data coding circuit 106 and the coded bit stream read by the media selection circuit 105, and transmitted as multimedia data.

As described above, similarly to the first embodiment, the conversion of screen image according to the present embodiment also can optimize the display positions and placement of the respective objects and encode a result of the optimization in correspondence with the type and capability of multimedia data reception terminal connected to the network and transmit, upon encoding multimedia data including plural objects and transmitting.

Other Embodiment

Further, the object of the present invention can be also achieved by providing a storage medium holding software program code for performing the aforesaid processes to a system or an apparatus, reading the program code with a computer (or CPU, MPU) of the system or apparatus from the storage medium, then executing the program. In this case, the program code read from the storage medium realizes the functions according to the embodiments, and the storage medium holding the program code constitutes the invention.

Further, the storage medium, such as a floppy disk, a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code is written in a function expansion board which is inserted into the computer or in a memory provided in a function expansion unit which is connected to the computer, a CPU or the like contained in the function expansion board or unit performs a part or entire actual processing in accordance with designations of the program code and realizes the functions of the above embodiments.

As described above, according to the present invention, when coded multimedia data having plural objects such as a moving image, a still image, a text, and a CG, and the like, is delivered, the multimedia data can be changed such that the display positions and layout of the respective objects are optimized in correspondence with the type and capability of reception terminal.

Further, as it is not necessary to prepare multimedia data for respective types of terminals, time and labor required for data editing can be greatly reduced.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus for delivering coded multimedia data to a reception terminal connected to the apparatus via a network, comprising:

first determination means for determining a screen size of a display screen of the reception terminal, based on device information of the reception terminal;

second determination means for determining whether or not display positions and placement of respective objects constructing the multimedia data are to be transformed, based on the determined screen size;

transformation means for transforming first object description data and first scene description data constructing the multimedia data, when said second determination means determines that the display positions and placement must be transformed, so as to change object(s) constructing the multimedia data without changing contents of the object(s) and to change a layout of the changed object(s) in the display screen of the reception terminal, to generate second object description data and second scene description data respectively, in accordance with the determined screen size; and selection means for selecting a coded bit stream of the object(s), described in the second object description data, from a predetermined storage device which holds a coded bit stream set for each object, wherein the coded bit stream sets are each coded by using a coding method suitable to a screen size of the display screen of the reception terminal, wherein the second object description data and the second scene description data are encoded, wherein the result of coding is multiplexed with the coded bit stream of the object(s) selected by said selection means, so that coded multimedia data is generated, and wherein the coded multimedia data is delivered to the reception terminal.

2. The data processing apparatus according to claim 1, wherein said transformation means changes a translation field of the object(s) included in the first scene description data, and thereby changes the layout of the object(s) in the display screen of the reception terminal.

3. The data processing apparatus according to claim 2, wherein said transformation means changes a translation field of the object(s) included in the first scene description data in correspondence with the determined screen size of the reception terminal.

4. The data processing apparatus according to claim 1, wherein said transformation means changes a fileName field of the object(s) included in the first object description data, and thereby changes the object displayed in the display screen of the reception terminal.

5. The data processing apparatus according to claim 4, wherein said transformation means changes a fileName field of the object(s) included in the first object description data in correspondence with a type of the reception terminal.

6. The data processing apparatus according to claim 1, wherein the multimedia data is in conformity with the MPEG-4 system.

7. The data processing apparatus according to claim 1, wherein each of the first scene description data and the second scene description data is described in BIFS.

8. The data processing apparatus according to claim 1, wherein the object includes a still image, a moving image, a CG, and a text.

9. A data processing method for delivering coded multimedia data to a reception terminal, comprising:
using a data processing apparatus, connected to the reception terminal via a network, to perform steps including:
a first determination step of determining a screen size of a display screen of said reception terminal, based on device information of the reception terminal;
a second determination step of determining whether or not display positions and placement of respective objects constructing the multimedia data are to be transformed, based on the determined screen size;
a transformation step of transforming first object description data and first scene description data constructing the multimedia data, when said second determination step determines that the display positions and placement must be transformed, so as to change object(s) constructing the multimedia data without changing contents of the object(s) and to change a layout of the changed object(s) in the display screen of the reception terminal, to generate second object description data and second scene description data respectively, in accordance with the determined screen size; and
a selection step of selecting a coded bit stream of the object(s), described in the second object description data, from a predetermined storage device which holds a coded bit stream set for each object, wherein the coded bit stream sets are each coded by using a coding method suitable to a screen size of the display screen of the reception terminal, wherein the second object description data and the second scene description data are encoded, and wherein the result of coding is multiplexed with the coded bit stream of the object(s) selected by said selection step, so that coded multimedia data is generated, and wherein the coded multimedia data is delivered to the reception terminal.

10. A program for making a computer execute the data processing method according to claim 9.

11. A storage medium holding the program according to claim 10.

* * * * *